(12) United States Patent
Miao et al.

(10) Patent No.: US 11,978,230 B1
(45) Date of Patent: May 7, 2024

(54) AERIAL OBJECT POSITION DETERMINATION SYSTEM

(71) Applicant: Birdstop, Inc., Concord, CA (US)

(72) Inventors: Keith Miao, East Palo Alto, CA (US); Robert Reynoso, Walnut Creek, CA (US); Jatin Kolekar, Sunnyvale, CA (US); Timothy McPhail, Pelham, AL (US)

(73) Assignee: Birdstop, Inc., Concord, CA (US)

( * ) Notice: Subject to any disclaimer, the term of this patent is extended or adjusted under 35 U.S.C. 154(b) by 0 days.

(21) Appl. No.: 18/231,508

(22) Filed: Aug. 8, 2023

(51) Int. Cl.
*G06T 7/70* (2017.01)
*H04N 23/698* (2023.01)
*H04N 23/90* (2023.01)

(52) U.S. Cl.
CPC ............ *G06T 7/70* (2017.01); *H04N 23/698* (2023.01); *H04N 23/90* (2023.01); *G06T 2207/10032* (2013.01); *G06T 2207/20081* (2013.01); *G06T 2207/30241* (2013.01)

(58) Field of Classification Search
None
See application file for complete search history.

(56) References Cited

U.S. PATENT DOCUMENTS

| 11,333,750 | B2* | 5/2022 | Li | G08G 5/0013 |
| 2019/0054937 | A1* | 2/2019 | Graetz | B61L 23/041 |
| 2021/0127059 | A1* | 4/2021 | Powell | G06T 5/006 |
| 2021/0350162 | A1* | 11/2021 | Miller | G08G 5/045 |
| 2023/0004174 | A1* | 1/2023 | Burghardt | B64C 39/024 |

OTHER PUBLICATIONS

Mariscal-Harana et al., "Audio-Based Aircraft Detection System for Safe RPAS BVLOS Operations," Department of Biomedical Engineering, School of Biomedical Engineering and Imaging Sciences, King's College, London, SE1 7EH, UK, Electronics 2020, 9(12), 2076. https://doi.org/10.3390/electronics9122076, 1.*
Kim et al., "3D Room Geometry Reconstruction Using Audi-Visual Sensors," CVSSP, University of Surrey, Guildford, University of Southampton, Southampton, 2017 International Conference on 3D Vision (3DV), DOI 10.1109/3DV.2017.00076.*
Kim et al., "Acoustic Room Modelling Using 360 Stereio Cameras," IEEE Transactions on Multimedia, vol. 23, 2021.*
Hafizovic et al., "Acoustic Tracking of Aircraft Using a Circular Microphone Array Sensor," IEEE, 2010.*

* cited by examiner

*Primary Examiner* — Edemio Navas, Jr.
(74) *Attorney, Agent, or Firm* — Cognition IP, P.C.; Edward Steakley

(57) ABSTRACT

An aerial object position determination system including an acoustic detection module comprising a plurality of microphones positioned about a central axis of the first unit; a computer vision module comprising multiple cameras positioned about the central axis of the first unit; an automatic dependent surveillance-broadcast (ADS-B) receiver provided with the first unit. One or more processors are configured to receive data from the acoustic detection module, the computer vision module and the ADS-B receiver. Based on the received data, the one or more processors determine a position of an aerial object. The determined position of the aerial object is transmitted to a receiving device.

22 Claims, 11 Drawing Sheets

AERIAL OBJECT POSITION DETERMINATION SYSTEM

CROSS-REFERENCE TO RELATED APPLICATIONS

Not applicable.

FIELD

The application relates generally to the field of object detection, and more specifically to an aerial object position determination system.

SUMMARY

The present era is experiencing rapid growth in new forms of aviation. This includes a wide array of uncrewed aircraft systems (UAS) for purposes ranging from remote sensing to drone delivery. These new entrants to the airspace pose a safety challenge to each other and to traditional aviation. To protect the airspace, regulators currently have significant restrictions on UAS operations. Chief amongst the restrictions is the requirement for maintaining operator visual line of sight (VLOS) during UAS flight, a stipulation that defeats the point of using UAS for most applications. In order to achieve an acceptable level of risk (ALR) for beyond visual line of sight (BVLOS) operations at meaningful scale, new methods of airspace management and deconfliction are necessary.

Disclosed herein is a novel airspace intelligence system built to determine the position of objects in the air in real-time. The system is designed to increase the transparency of the airspace to all its stakeholders with the intention to improve safety through deconfliction. Using this airspace intelligence system, airspace users will be able to detect and avoid (DAA) potential threats with ample notice.

The system uses a network of airspace intelligence units (also referred to as airspace beacons). Each airspace intelligence unit tracks its immediate surrounding airspace and is analogous to the air traffic control (ATC) tower seen at major airports. Like an ATC tower, each airspace intelligence unit supports the safety of aerial activity in its vicinity. Each airspace intelligence unit contains multiple reinforcing technology layers for the tracking of objects in the airspace. These tracking layers include but may not be limited to: visual/optical sensors (e.g., cameras), acoustic sensors (e.g., microphones), receivers for crewed aircraft broadcasting (e.g., ADS-B), receivers for uncrewed aircraft broadcasting (e.g., Remote ID), and other sources and means for acquiring airspace data. Each airspace intelligence unit is modular so that any combination of functionality can be placed on any given airspace intelligence unit at any given location. Each airspace intelligence unit may also include other modules not directly used in the tracking of aerial objects but may be helpful in mitigating airspace risk, such as in providing weather intelligence.

Each airspace intelligence unit includes several airspace tracking layers. Whereas each individual layer may have its own shortcomings, the use of multiple fundamentally different layers for an airspace intelligence unit bolsters the effectiveness of the overall stack of functionality. For instance, optical tracking may be less effective when there is fog, but acoustic tracking would not be much impaired by it. However, acoustic tracking may be less effective in a loud environment, whereas optical tracking would be immune to that. In this way, the airspace intelligence system uses the Swiss cheese principle of risk management whereby each airspace tracking layer is an independent layer of Swiss cheese. Although no layer is invulnerable (i.e., each layer has holes) when multiple layers are lined up, it becomes much less likely that a hazard (i.e., an aerial object) would go undetected through the holes of all independent layers.

When two or more airspace intelligence units are used together, each airspace intelligence unit functions as one node in a network topology. Each airspace intelligence unit communicates with other nearby airspace intelligence units to triangulate object positions and cover potential weak spots for those other airspace intelligence units. By adding more airspace intelligence units to the network, this airspace intelligence system is designed to scale up economically from a local to a national level.

In some embodiments, there is an aerial object position determination system including an acoustic detection module comprising multiple microphones positioned about a central axis of the first unit; a computer vision module comprising multiple cameras positioned about the central axis of the first unit; an automatic dependent surveillance-broadcast (ADS-B) receiver provided with the first unit. One or more processors are configured to receive data from the acoustic detection module, the computer vision module and the ADS-B receiver. Based on the received data, the one or more processors determine a position of an aerial object. The determined position of the aerial object is transmitted to a receiving device.

In some embodiments, the system determines airspace conflict situations by evaluating observed aerial objects in the airspace. The system may transmit information about aerial objects, such as their location, air speed, trajectory, etc., to other computing devices, radios and aircraft. Moreover, the system may provide potential conflict assessment, such as indication of the likelihood of collision between aerial objects. The system may consider the trajectory, air speed and maneuverability of an aerial object in determining a potential conflict assessment.

In some embodiments, the system uses a computer vision module to obtain video and/or multiple images of the airspace about an airspace intelligence unit. The system uses a trained machine learning network or model to process images obtained by the system. The system may determine a general and sub-type of an aerial object. The system may determine a size of the aerial object via the images and based on a known size for the sub-type of the aerial object, the system may determine an approximate distance of the aerial object from an airspace intelligence unit.

In some embodiments, the system uses an acoustic monitoring module to obtain and record ambient sounds. The system determines the direction of travel of the ambient sounds and determines an approximate location of an aerial object that is the source of the sound.

Furthermore, the appended claims may serve as a summary of this application.

DETAILED DESCRIPTION OF THE DRAWINGS

Figure 1:
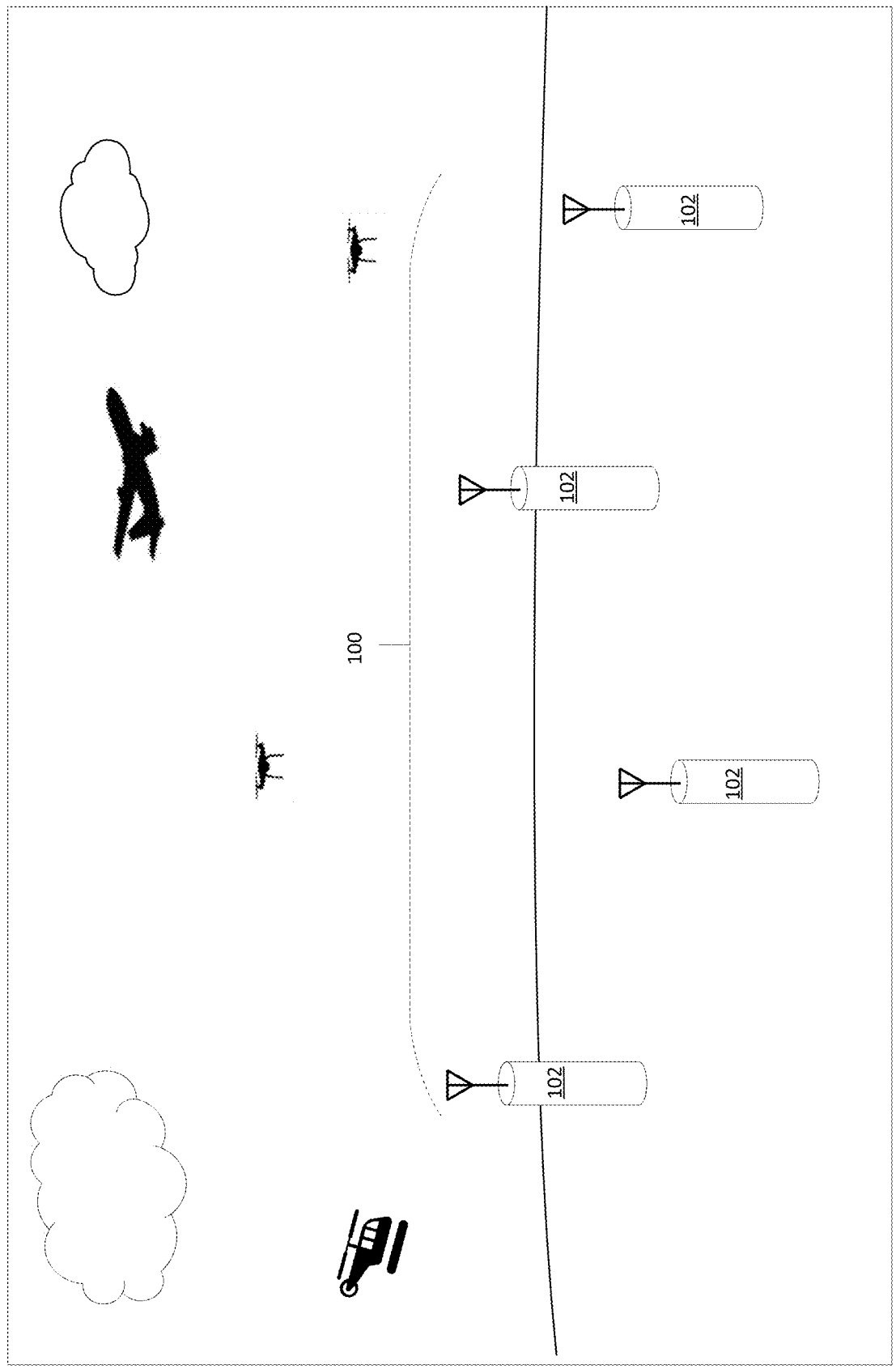
FIG. 1 a diagram illustrating an example aerial object position determination system 100 with multiple airspace intelligence units 102.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially.

FIG. 1 is a diagram illustrating an example aerial object position determination system 100 with multiple airspace intelligence units 102. Airspace intelligence units 102 of the aerial object position determination system are placed in areas allowing observation of airspace to detect the movement of aerial objects in the airspace. Examples of aerial objects that may be detected include aircraft such as airplanes, rotorcraft, gliders, lighter-than-air, powered-lift, powered parachute, weight-shift control aircraft, drones, unmanned aerial vehicles, helicopters, etc. The airspace intelligence units 102 may be placed on or connected to structures to observe the airspace about the structures. For example, airspace intelligence units may be positioned on buildings, roof tops, cell towers, utility poles, ground platforms, etc.

Each airspace intelligence unit 102 detects movement of aerial objects moving through or about the airspace around an airspace intelligence unit. In some configurations, multiple airspace intelligence units 102 are located such that the observation area of an airspace intelligence unit 102 overlaps. This allows two or more airspace intelligence units 102 to observe a portion of the same airspace.

Figure 2:
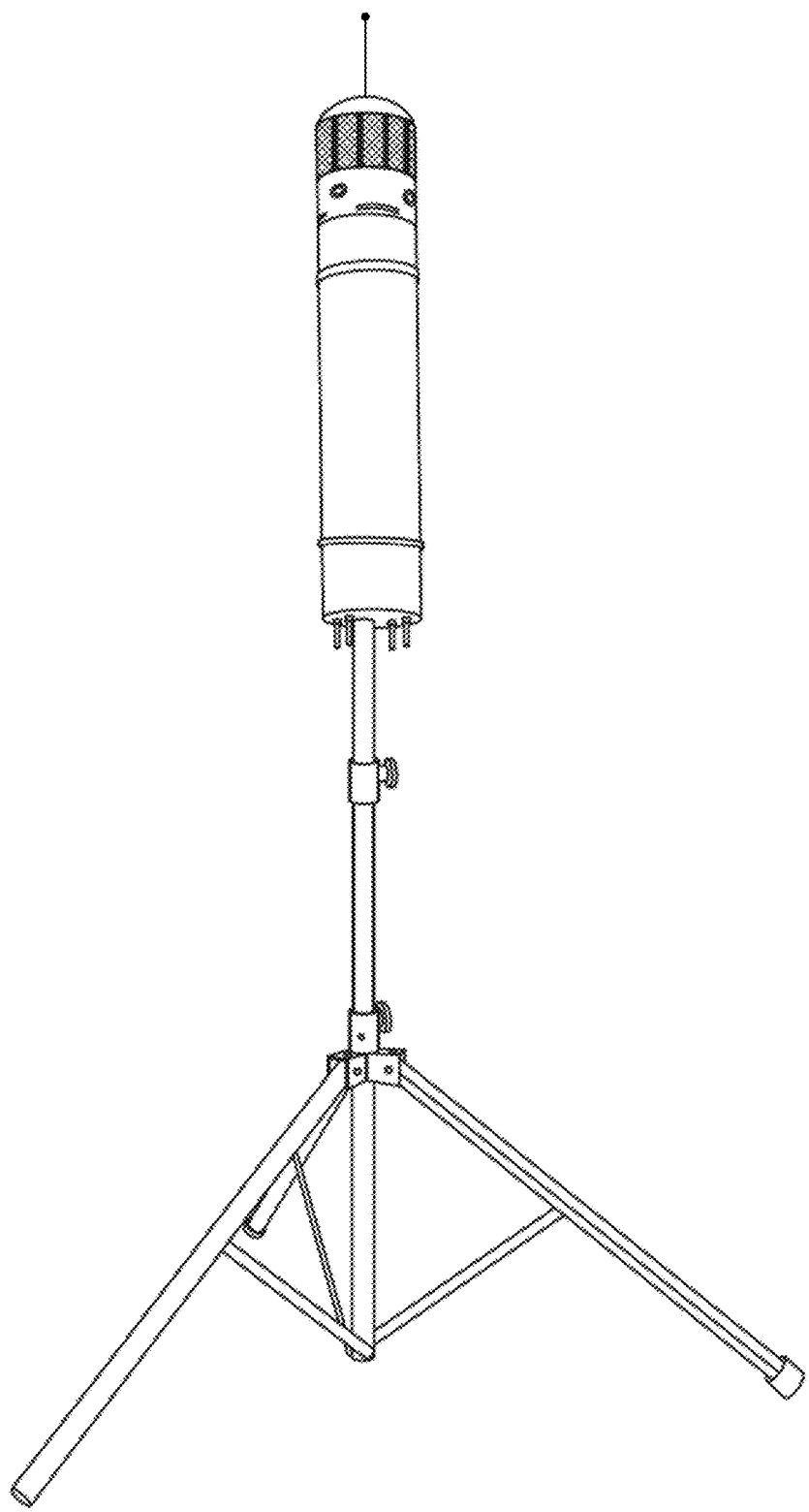
FIG. 2 is a diagram illustrating an example of an airspace intelligence unit of the aerial object position determination system 100.

FIG. 2 is a diagram illustrating an example of an airspace intelligence unit 102 of the aerial object position determination system 100 referred to in FIG. 1. In some embodiments, the system 100 may be temporarily deployed to observe airspace in an area where aircraft operations will be performed. For example, an airspace intelligence unit 102 may be mounted to a stand or pole and placed in a location for observation of airspace about the airspace intelligence unit 102. Multiple airspace intelligence units 102 may be placed in various locations if an extended area of airspace observation is desired. For example, the aerial object position determination system 100 may be temporarily deployed into a field environment to observe operations of aircraft in that area. The system 100 is especially useful to support operations of unmanned aerial vehicles (UAV), such as those UAVs operating beyond visual line of sight. Multiple airspace intelligence units 102 may be deployed about locations where the flight path of the UAV would move about or around an area. The system 100 provides airspace observation aiding a UAV operator in confirming the aerial position of the UAV in relation to other aerial objects. Where the airspace intelligence unit 102 is deployed in remote areas, the unit 102 may be configured with satellite and/or cellular communication radios to transmit data to a receiving device or server. Moreover, the airspace intelligence unit 102 may be configured with a direct current battery system with the battery system being rechargeable via solar panels.

Figure 3:
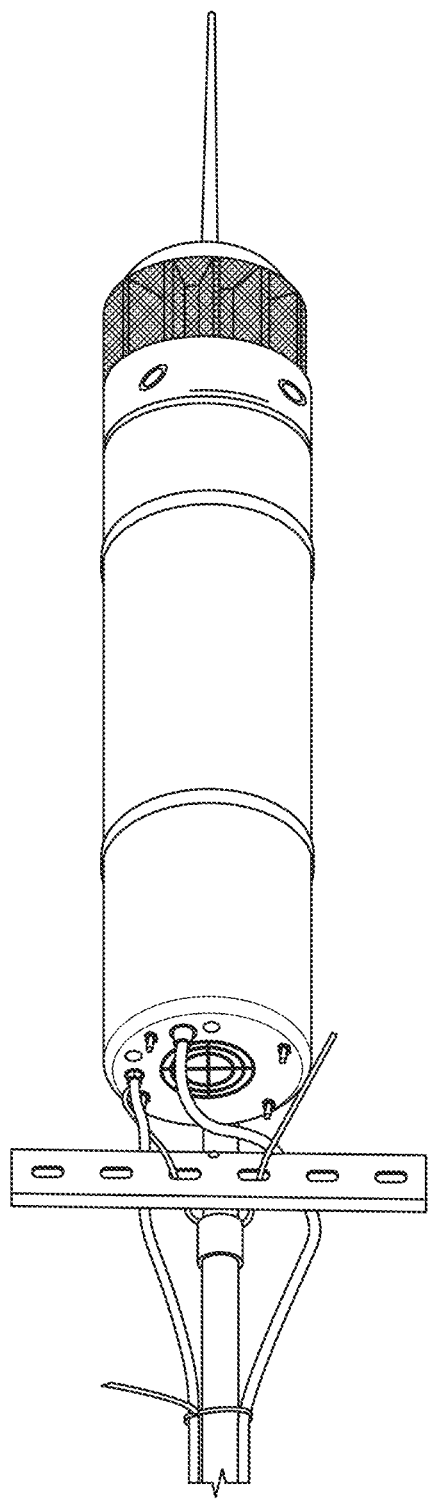
FIG. 3 is a diagram illustrating an example of an airspace intelligence unit of the aerial object position determination system 100.
Figure 4:
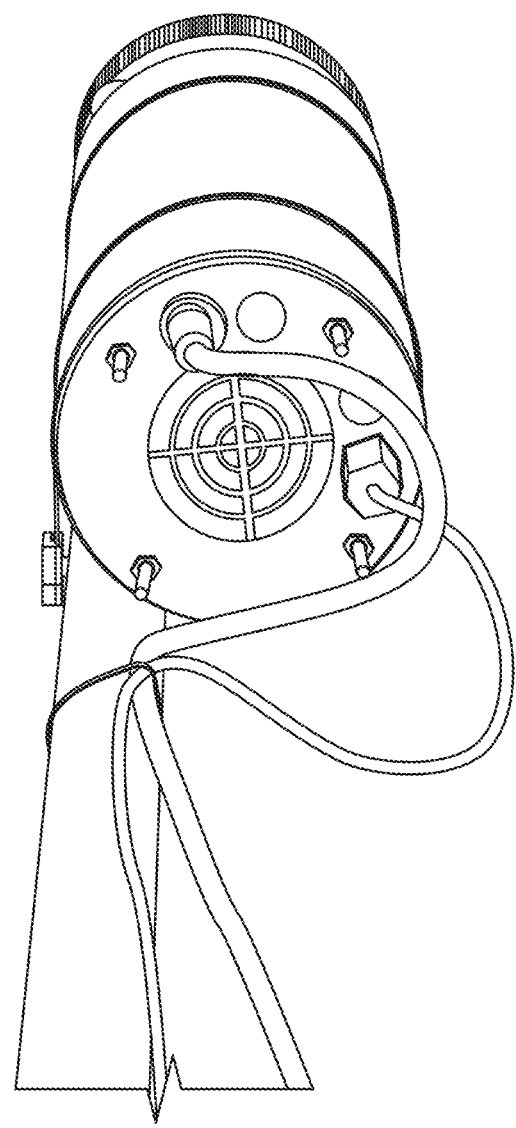
FIG. 4 is a diagram illustrating an example of an airspace intelligence unit of the aerial object position determination system 100.

FIGS. 3 and 4 are diagrams illustrating examples of an airspace intelligence unit 102 of the aerial object position determination system 100 in a fixed configuration. In some embodiments, the system 100 may be permanently fixed or positioned onto a structure. For example, an airspace intelligence unit 102 may be coupled or connected to a pole or other structure. In this configuration, the airspace intelligence unit 102 may be powered from available or nearby electrical sources providing alternating or direct current. Also, for unit 102 installed in a fixed location, the airspace intelligence unit 102 may provide communications by wireless systems as described above and/or via a wired connection such as a fixed ethernet connection via a router, hub or switch. An airspace intelligence unit 102 transmits the data to a receiving device and/or server.

Figure 5A:
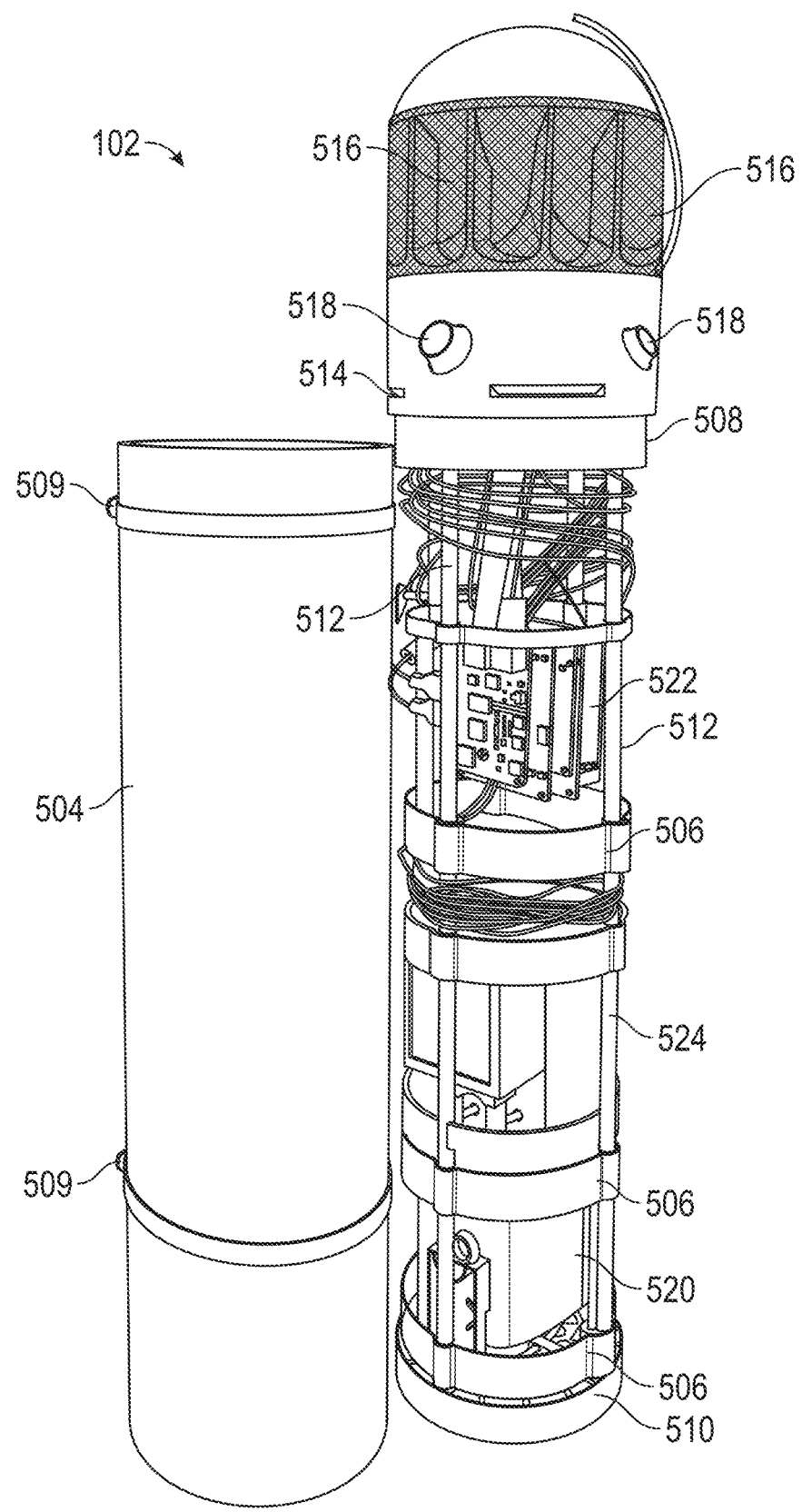
FIGS. 5A-5C are diagrams illustrating an example of an airspace intelligence unit of the aerial object position determination system 100.
Figure 5B:
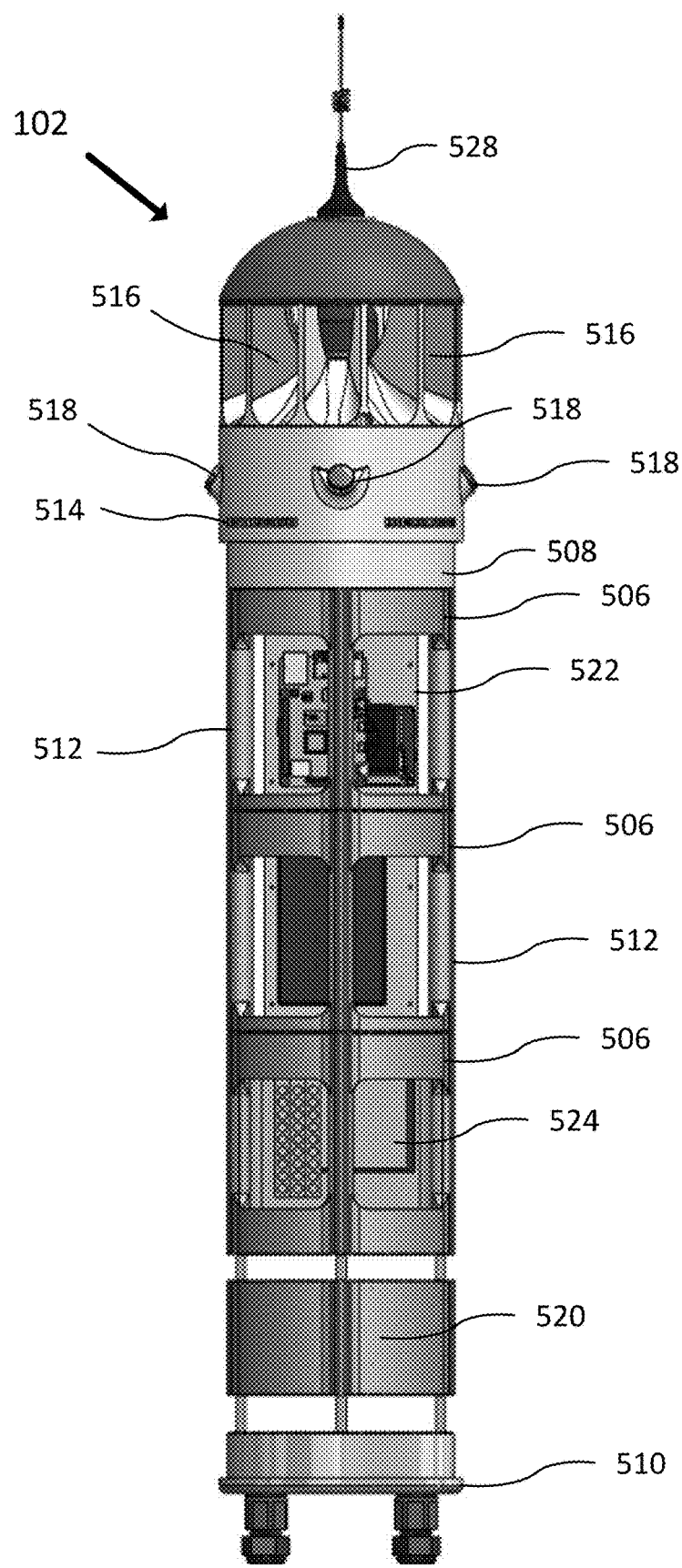
Figure 5C:
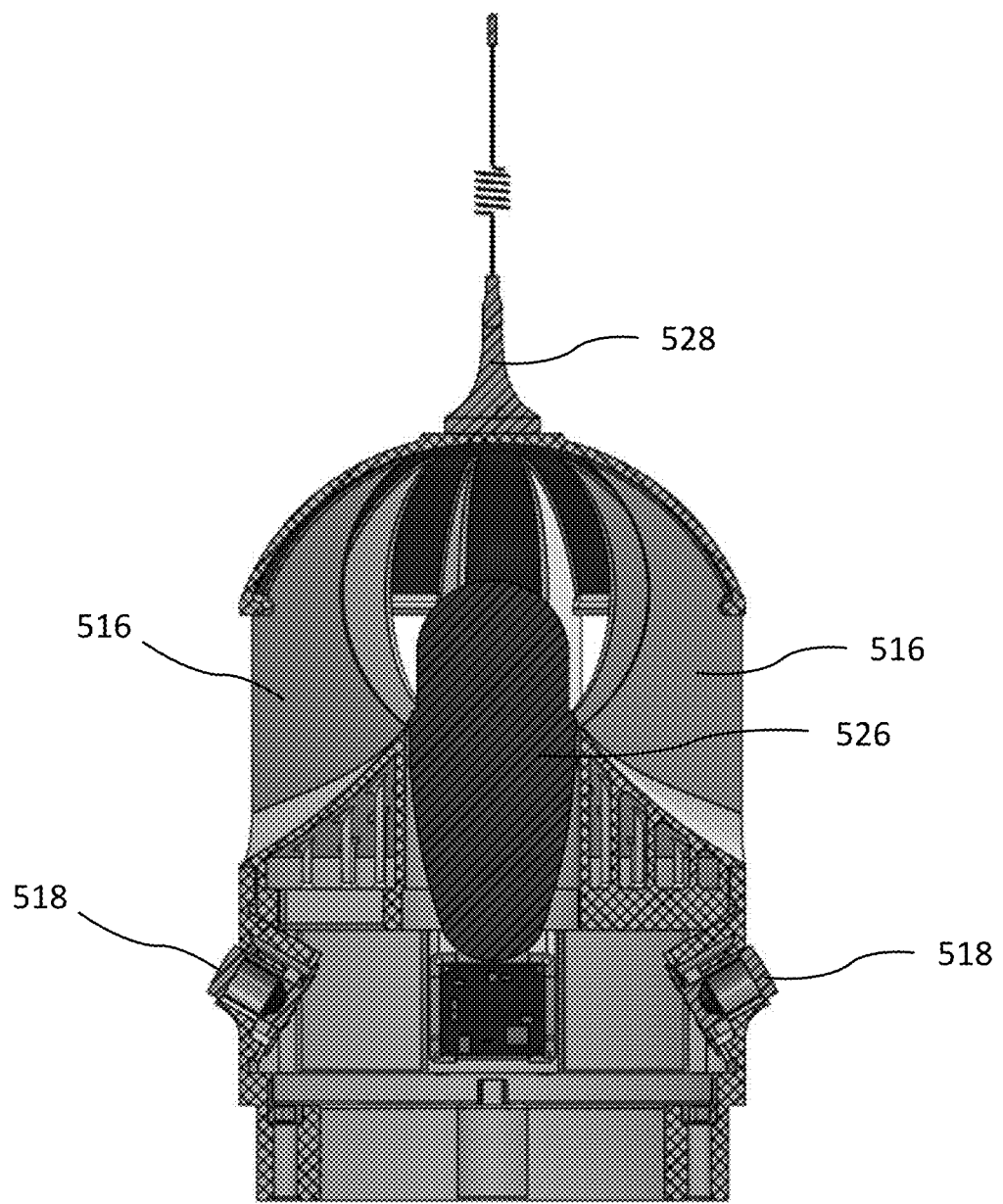

FIGS. 5A-5C are diagrams illustrating an example of an airspace intelligence unit 102 of the aerial object position determination system 100. The airspace intelligence unit 102 includes multiple mounting frames 506, a top component 508 and a base 510. In some embodiments, an individual unit includes an internal modular mounting structure and an external housing 504 that encloses the internal modular mounting structure. The internal modular mounting structure includes multiple mounting frames 506 and multiple longitudinal rods 512 disposed through the mounting frames 506.

An airspace intelligence unit 102 is configured to be weather-proof since the airspace intelligence unit 102 will likely be exposed to rain or snow during the aerial object detection operations. The external housing 504 couples with a top component 508 and a base component 510. The coupling of the top component 508 with a top section of the external housing 504 provides a waterproof seal. A hose clamp 509 may be used to tighten the top section about the bottom section of the top component 508. The top component 508 may include perforations radially disposed about the body of the top component 508. The perforations are angled upward and through the body of top component 508 so that water does not drip into the top component 508.

The structures of the airspace intelligence unit 504, 506, 508 and 510 may be assembled together via longitudinal rods 512. In some embodiments, a bottom portion of the longitudinal rod 512 is connected at various points about the outer radius of the base 510. For example, the base 510 may have four locations at 90 degree intervals where a longitudinal rod is connected. The multiple mounting frames 506 are stacked on top of each other. A mounting frame 506 has openings disposed through the mounting frame 506 to allow the longitudinal rods 512 to pass through the openings. For example, the mounting frame 506 may have four locations at 90 degree intervals where a longitudinal rod is connected. Various mounting frames 506 may be stacked upon each other. The longitudinal rods are connected to the top component 508.

An airspace intelligence unit 102 is configured to be modular to allow the addition/removal of different sensors or modules to the airspace intelligence unit. The internal mounting structure includes multiple mounting frames 506 that are placed in series on top of one another. A mounting frame 506 may include, for example, electronics, fans 520, batteries 524, subsystems, computer processors 522, circuitry, data storage devices, graphical processing units, etc. The mounting frames 506 provide for modular configuration of the airspace intelligence unit 102 to add the electronics desirable for the airspace intelligence unit 102.

In some embodiments, the top component 508 includes acoustic observation structures and cameras mounted about the top component 508. The acoustic observation structures comprise multiple ports positioned radially about a central axis of the top component 508. The multiple ports direct ambient sound waves towards a center portion of the top component 508. One or more microphones 526 are positioned in the top component 508 to record (i.e., listen to) the ambient sound about the airspace intelligence unit. The signals from one or more microphones are further processed by the processing system. In some embodiments, a single omni-directional microphone is positioned in the top component 508. In some embodiments, each acoustic port may have a corresponding microphone affixed thereto. Based on the microphone and signal strength (i.e., the amplitude of incoming sound waves), the system 100 may determine the direction of the sound from an aerial object relative to the airspace intelligence unit 102. Moreover, the system 100 may have an internal electronic compass and/or heading sensor that senses the magnetic orientation of the airspace intelligence unit 102. For example, the airspace intelligence unit 102 may determine a radial degree of the airspace intelligence unit 102 where the source of sound is located.

In some embodiments, an airspace intelligence unit 102 may have an onboard weather station or receive location weather data from a remote source. The airspace intelligence unit may calculate a direction and/or speed of movement of a sound source by evaluating the signals recorded of the ambient sound. The airspace intelligence unit 102 may evaluate the sound signals and determine the direction and/or speed while considering the ambient wind speed, the ambient air temperature and/or the atmospheric pressure which may have an effect on the speed of travel of sound from the sound source.

In some embodiments, the top component 508 includes multiple cameras 518 positioned radially about the top component 508. The multiple cameras 518 provide a 360 degree view about or around a central axis of the airspace intelligence unit 102. A camera 518 may have an overlapping field of view with an adjacent camera such that when the two cameras concurrently obtain images, a portion of each image would have overlapping pictures of the airspace. In some embodiments, the multiple cameras 518 are positioned upward between about 30 to 75 degrees from a horizontal plane intersecting a central axis of the individual unit. For example, the cameras may be fixed in a position where the camera is pointed upwards to obtain imagery of aerial objects near the airspace intelligence unit 102.

In some embodiments, the top component 508 has four cameras equally spaced about 90 degree intervals. In some embodiments, each camera has a field of view ranging from 100-150 degrees. As discussed previously, the system 100 may have an internal electronic compass and/or heading sensor that senses the magnetic orientation of the airspace intelligence unit 102. The airspace intelligence unit 102 may determine the compass magnetic direction or orientation of each of the cameras. In some implementations, the airspace intelligence unit 102 may be set up such that each of the cameras is oriented towards a cardinal direction (e.g., North, East, South and West). Each of the cameras may be associated with the direction in which it faces. The direction may be used by the airspace intelligence unit 102 to determine a direction of travel of an aerial object as detected in video and/or multiple images of an aerial object traversing through the ambient airspace.

In some embodiments, a mounting frame 506 may be configured with one or more computer processors and/or graphical processing units. The computer processors and the graphical processing units perform computational operations and processing of data/signals received from the acoustic observation system and the computer vision system.

In some embodiments, a mounting frame 506 may be configured with a fan. The fan may be configured to draw air into the base 510 and blow the air upward through the housing 504 and out of the top component 508. Alternatively, the fan may be configured to draw air into the top component 508 and down and through the housing 504 and out of the base 510.

In some embodiments, a mount frame 506 may be configured with a battery pack. For example, the battery pack may include rechargeable batteries, such as lithium ion, lithium phosphate, or other types of rechargeable batteries. A DC to AC converter may be electrically coupled to the battery pack to provide alternating current to any of the electronics that require AC.

In some embodiments, a mounting frame 506 may be configured with various telecommunications devices for transmission of data. For example, the mounting frame 506 may include cellular and/or satellite transceiver devices to provide for wireless communication and transmission of data from the airspace intelligence unit 102 to a separate computing device or server.

In some embodiments, a mounting frame 506 may be configured with a Global Positioning System, Global Navigation Satellite System, BeiDou Navigation Satellite System and/or Galileo Navigation Satellite System. Airspace intelligence units 102 equipped with these systems allow the airspace intelligence unit 102 to determine its geo-spatial location. Moreover, the airspace intelligence unit 102 may be configured with a Real Time Kinematics (RTK) system to provide for greater position accuracy of geo-spatial location. In some embodiments, an installed airspace intelligence unit's geo-spatial position may be determined by external surveying devices. The external surveying devices may obtain a specific geo-spatial location and altitude of where the airspace intelligence unit is installed. The specific geo-spatial location and altitude may be stored in non-volatile memory of the airspace intelligence unit. The specific geo-spatial location and altitude (whether determined dynamically or using the static location) may be used as a reference or origin location in determining the position and/or distance of aerial objects from the airspace intelligence unit 102.

In some embodiments, a mounting frame 506 may be configured with an automatic dependent surveillance-broadcast (ADS-B) receiver. The ADS-B system combines an aircraft's positioning source, aircraft avionics, and a ground infrastructure to create an accurate surveillance interface between aircraft and ATC. The airspace intelligence unit 102 may use the ADS-B receiver to receive transmission from aircraft flying in the vicinity of the airspace intelligence unit. The airspace intelligence unit 102 uses the received information from an aircraft to confirm whether a detected aerial object is the same aircraft from the received ADS-B transmission, when available.

Figure 6:
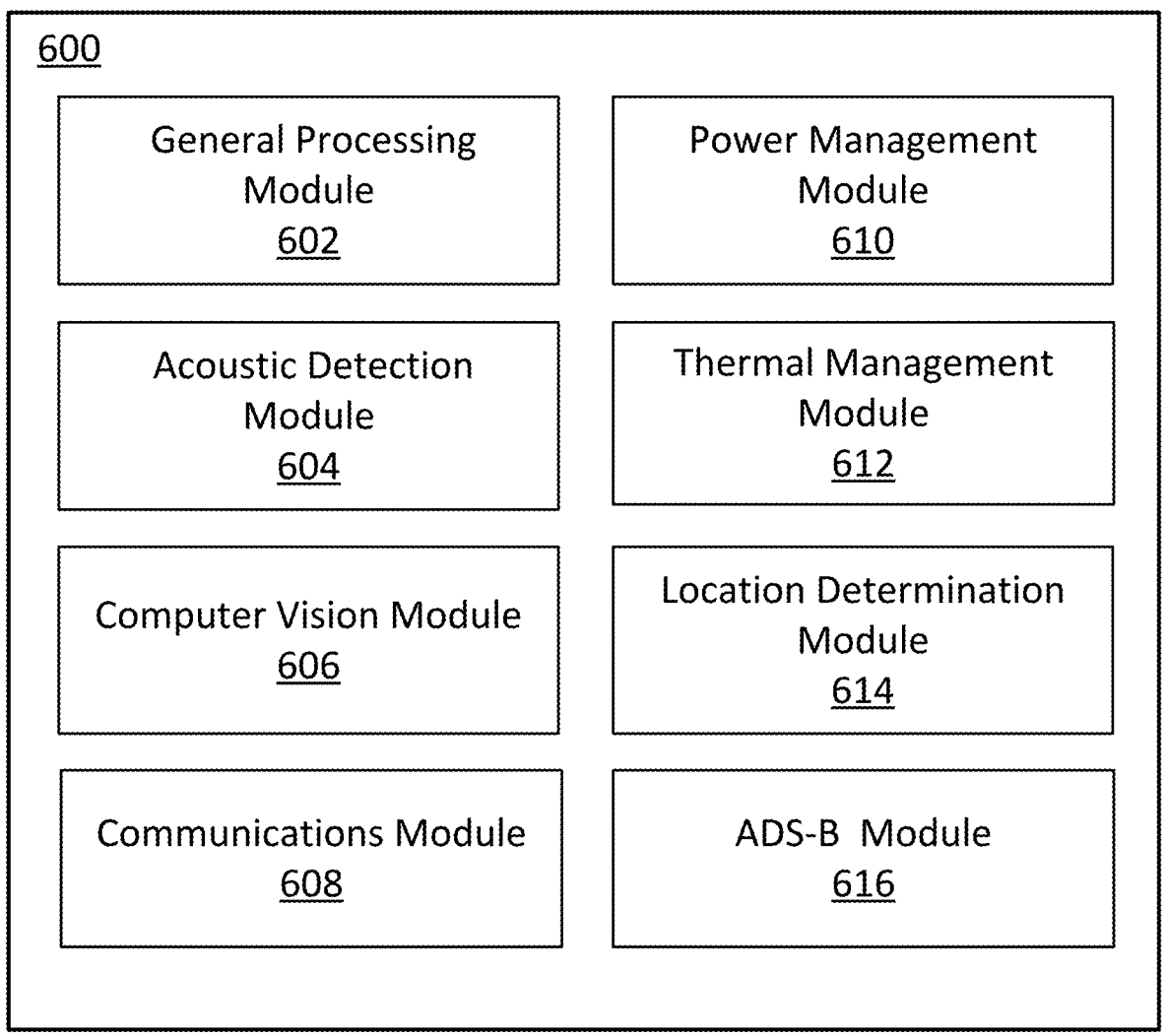
FIG. 6 is a diagram illustrating modules of an airspace intelligence unit of the aerial object position determination system.

FIG. 6 is a diagram illustrating modules of an airspace intelligence unit 102 of the aerial object position determination system. In some embodiments, the airspace intelligence unit 102 includes multiple modules performed by one or more computer or graphic processes. In some embodiments, the airspace intelligence unit 102 include a General Processing Module 602, an Acoustic Detection Module 604, a Computer Vision Module 606, a Communications Module 608, a Power Management Module 610, a Thermal Management Module 612 and a Location Determination Module 614. The General Processing Module 602 is configured to perform general and system control operations of the airspace intelligence unit 102. The Acoustic Detection Module 604 is configured to process audio signals and determine a source direction and an amplitude of ambient sound waves. The Computer Vision Module 606 is configured to perform the operation and control of the cameras, and processing of images received from the cameras. The Power Management Module 610 is configured to perform control operations related to battery management. The Thermal Management Module 612 is configured to perform operation and control of the fans and/or other mechanisms to provide temperature management for the airspace intelligence unit 102. The Location Determination Module is configured to determine the location of the airspace intelligence unit, such as receiving a geo-spatial location from onboard GPS system.

Figure 7:
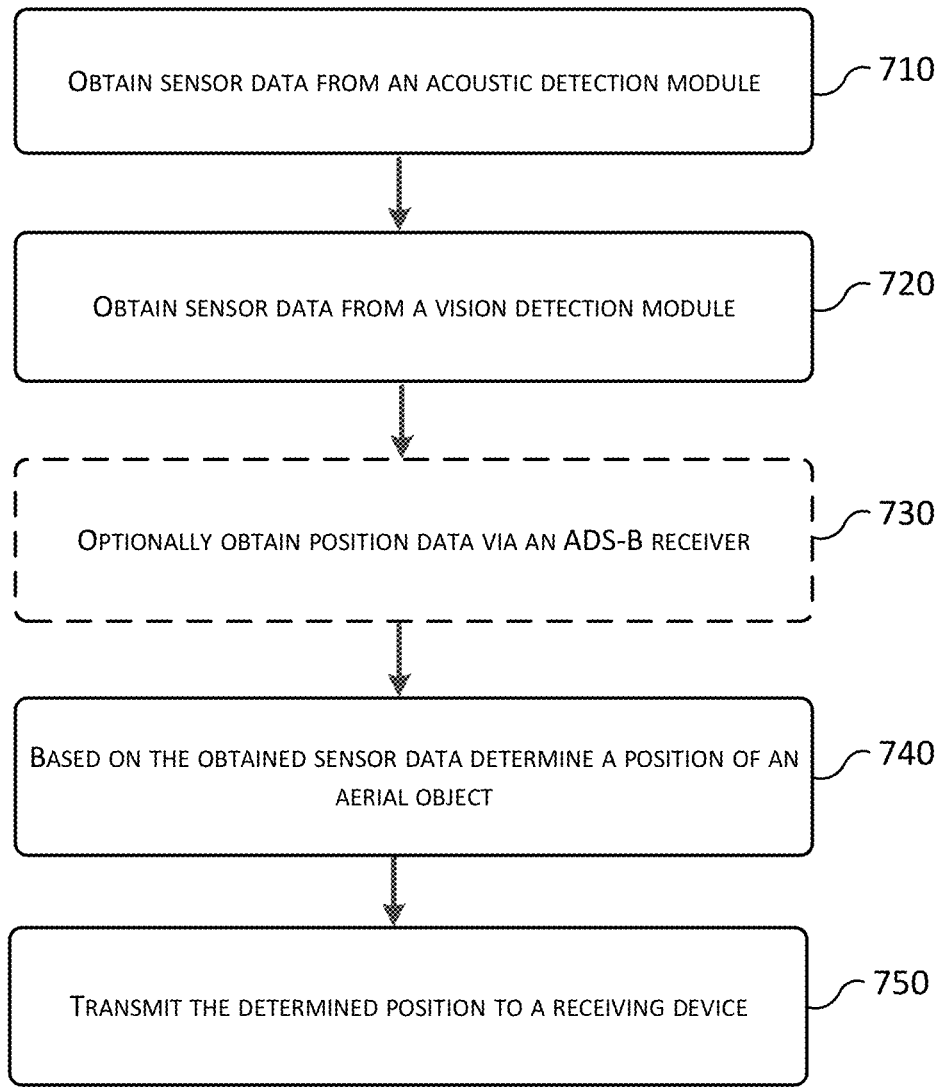
FIG. 7 is a flowchart illustrating the method 700 of operation of the aerial object position determination system 100.

FIG. 7 is a flowchart illustrating the method 700 of operation of the aerial object position determination system 100. As described herein, an airspace intelligence unit 102 of the aerial object position determination system, obtains sensor data of the surrounding airspace of an airspace intelligence unit 102. In some embodiments, the airspace intelligence unit 102 includes an acoustic monitoring module to obtain ambient sound information, a computer vision module to obtain imagery over the surrounding airspace and an ADS-B receiver to obtain position information from nearby broadcasting aircraft.

The acoustic monitoring module is configured to record sound information from 360 degrees of a central axis of the airspace intelligence unit. The airspace intelligence unit 102 may identify the direction from which the sound is observed by associating the microphone or microphones from which the sound source is recorded. Based on an evaluation of which microphone(s) recorded the sound and the amplitude of the recorded sound signal, the airspace intelligence unit, via one or more of the computing processors, identifies the direction (e.g., a magnetic direction of the source of the ambient sound). Where the sound is picked up or recorded by multiple microphones, the airspace intelligence unit may determine that the sound originates from a range of some magnetic direction (such as 35-75 degrees). Moreover, the acoustic monitoring module records sound over a period of time. As such, the airspace intelligence unit, may determine that the ambient sound is moving or shifting over the period of time from one microphone to another microphone.

The airspace intelligence unit 102 may identify a direction of travel of the sound by evaluation of which microphones recorded the sound source. The airspace intelligence unit 102 determines a direction of travel by assessing the movement of the sound over the period of time. In some embodiments, the airspace intelligence unit, via one or more processors, evaluates an amplitude of the signal and identifies the direction of travel of the sound in relation to the microphones that recorded the sound. The airspace intelligence unit 102 may identify generally the direction of travel, such as determining travel of an object from 90 degrees to 270 degrees (indicating travel from East to West). For example, the airspace intelligence unit may record the sound of a propeller plane passing through the airspace near the airspace intelligence unit 102. The airspace intelligence unit 102 may determine based on recorded sound signals over a period of time that an aerial object is moving from one magnetic location to another magnetic location. This determination also provides information for the airspace intelligence unit 102 to calculate a general magnetic course or direction of the plane being observed.

Additionally, an airspace intelligence unit 102 of the aerial object position determination system 100 obtains images from multiple cameras poised about a central axis of the airspace intelligence unit 102. The airspace intelligence unit 102 may determine via an onboard computer vision module the objects traversing through the airspace near the airspace intelligence unit. Video imagery or a series of image frames are processed by the airspace intelligence unit 102 to identify an object in the video imagery or the series of image frames. Similar to the acoustic monitoring module, the computer vision module may determine the direction of travel of an object by analyzing multiple images and identifying a direction of travel of the object in the images. For example, the airspace intelligence unit may identify an object in the images and determine that the object is moving in a particular direction. The cameras obtaining the images may be calibrated or associated with a magnetic direction, and based on the camera(s) obtaining the images, the direction of an object may be correlated or associated to a magnetic direction of travel.

Moreover, the airspace intelligence unit may calculate based on the movement of pixels of a detected aerial object in two or more images, a speed, velocity and/or a trajectory of the detected aerial object in the images.

Furthermore, the airspace intelligence unit 102 of the aerial object position determination system 100 may optionally have an onboard ADS-B receiver. The airspace intelligence unit 102 may receive position information from an aircraft in the nearby airspace. The airspace intelligence unit 102 may provide this information to a separate device or server.

Referring to the flow chart depicted in FIG. 7, the processing system of the airspace intelligence unit 102 may perform a method 700 of obtaining the sensor data, determining a position of an aerial object, and transmitting the determined position to a receiving device. In step 710, the airspace intelligence unit 102 obtains sensor data from an acoustic detection module. The acoustic detection module (e.g., the acoustic monitoring module) evaluates and determines the direction of an ambient sound source. In step 720, the airspace intelligence unit 102 obtains sensor data from a vision detection module (e.g., the computer vision module). The computer vision module obtains imagery of the airspace near the airspace intelligence unit 102. The airspace intelligence unit 102 processes the images and identifies objects in the images and a direction of travel of the object(s) in the images. In step 730, the airspace intelligence unit 102 optionally obtains positional data from nearby aircraft via an ADS-B receiver. In step 740, the obtained sensor and optional ADS-B aircraft position data are processed and a position of an aerial object is determined. The position of the aerial object may include the geo-spatial location of the aerial object, a direction of travel of the aerial object, a velocity of travel of the aerial object and/or a trajectory of the aerial object.

Figure 8:
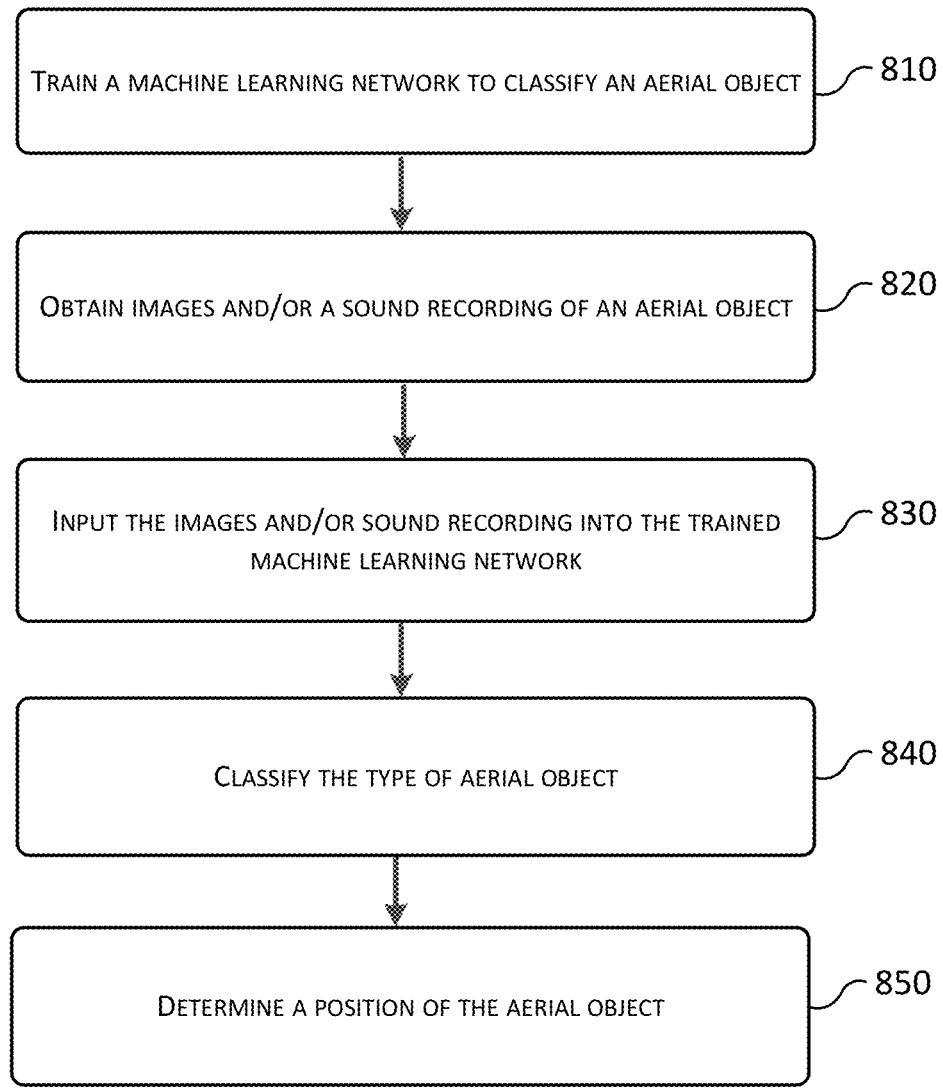
FIG. 8 is a flowchart illustrating the method 800 of operation of the aerial object position determination system 100.

FIG. 8 is a flowchart illustrating a method 800 of operation of the aerial object position determination system 100. The airspace intelligence unit 102 may use one or more trained machine learning networks or models to process obtained sensor data.

In some embodiments, the airspace intelligence unit 102 may utilize a trained machine learning network to process images obtained from the onboard cameras. The machine learning network may be trained to determine or classify objects detected in the images. The training of the machine learning network for example may be based on supervised learning where objects in the images are identified or classified.

In some embodiments, the airspace intelligence unit 102 may utilize a trained machine learning network to process sound signals obtained from the onboard microphones. The machine learning network may be trained to determine or classify a type of aerial object based on the sound signature. For example, the airspace intelligence unit 102 may identify whether the sound is a jet aircraft, a helicopter, a propeller plane, a UAV, etc. The machine learning network may be trained on different sources of audio files for different types of aircraft.

In some embodiments, the machine learning network is a neural network, such as a convolutional neural network, a recurrent neural network, a modular neural network, etc. Neural networks may be comprised of a plurality of neural network nodes. Neural network nodes may be connected to each other such that the output of one node is the input of another node. Moreover, neural network nodes may be organized into layers, each layer comprising one or more nodes.

Referring to the flow chart depicted in FIG. 8, the processing system of the airspace intelligence unit 102 may perform the method 800 of using a trained machine learning network to classify and/or determine a position of an aerial object.

In step 810, a machine learning network or model is trained to classify an aerial object. In step 820, images of airspace about an airspace intelligence unit depicting an aerial object and/or sound recordings of an aerial object are obtained. In step 830, the images and/or sound recordings are used as input in the trained machine learning network. In step 840, a type of aerial object is classified by the machine learning network. In step 850, the position of the aerial object is determined by the machine learning network.

Figure 9:
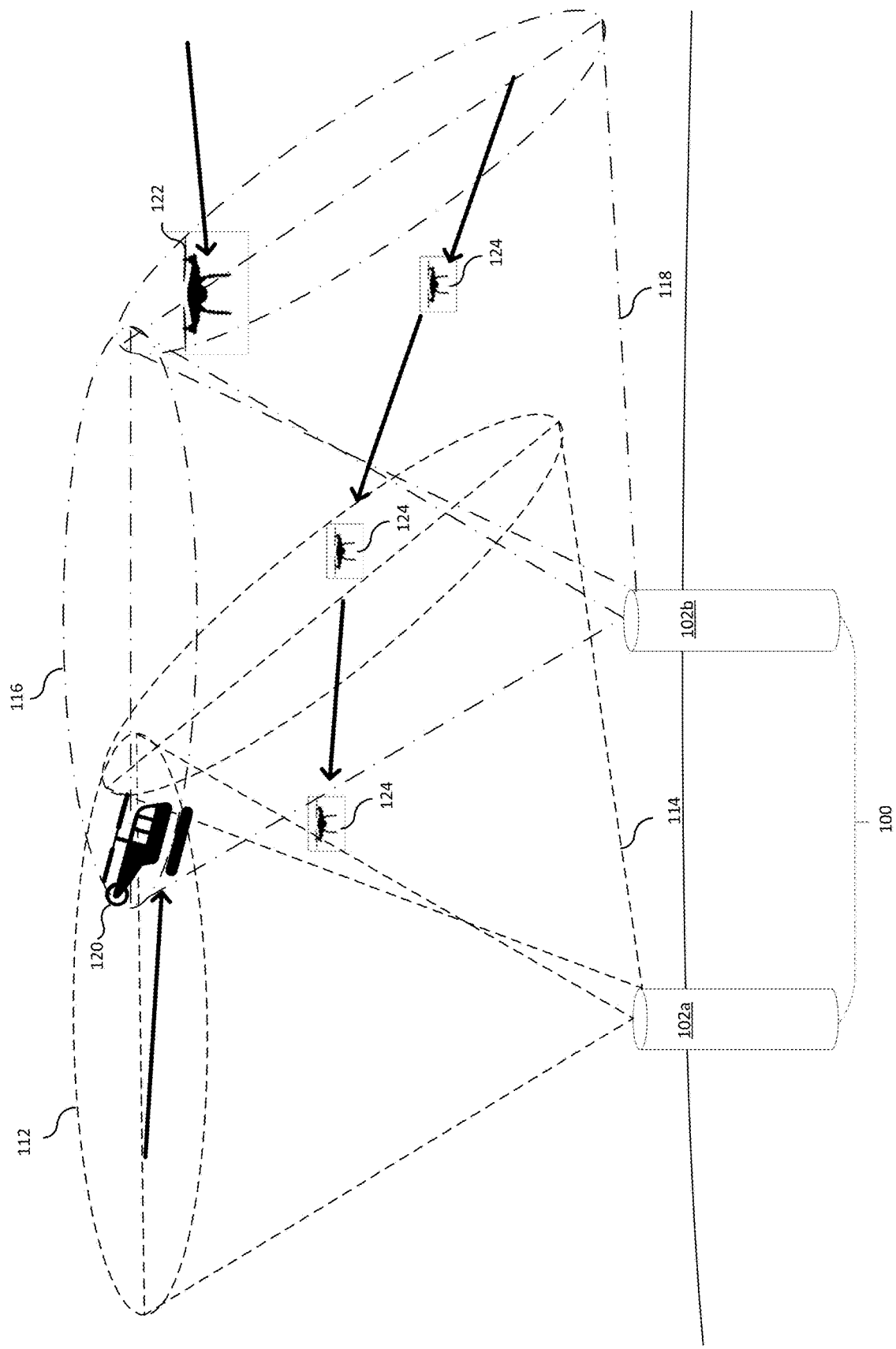
FIG. 9 a diagram illustrating an example aerial object position determination system 100 with multiple airspace intelligence units.

FIG. 9 is a diagram illustrating an example aerial object position determination system 100 with multiple airspace intelligence units 102a, 102b. As described herein, each of the airspace intelligence units 102a, 102b includes one or more sensors to observe the airspace about an airspace intelligence unit. For example, an airspace intelligence unit may be configured with one or more sensor modules, such as an acoustic monitoring module, a computer vision module, a radar system, an ADS-B system, an onboard weather system (e.g., to monitor temperature, humidity, wind speed and/or air pressure), a geo-spatial location system (e.g., GPS). Furthermore, the airspace intelligence units include wired and/or wireless communications systems to transmit data from the airspace intelligence unit 102 to another device (such as another airspace intelligence unit 102, a computing device, a computer server, ground control station for UAV operations and/or to an aircraft communications system).

FIG. 9 depicts an example configuration of multiple airspace intelligence units 102a, 102b deployed in a geographic area. In this example, multiple aircraft are moving about the airspace (e.g., a helicopter 120, a first UAV 122 and a second UAV 124). The second UAV 124 is depicted at different time intervals moving about the airspace from a right to left direction. In this example, the airspace intelligence units 102a, 102b are each configured with a computer vision module and an acoustic monitoring module.

The computer vision module obtains images of the airspace near the airspace intelligence unit 102a, 102b. In some embodiments, an airspace intelligence unit is configured with four cameras with overlapping field of view. The field of view cones 112 and 114 depict an example field of view of a first and second camera positioned on a first airspace intelligence unit 102a. The field of view cones 116 and 118 depict an example field of view of a first and second camera positioned on a second airspace intelligence unit 102b. The field of view cones 112, 114, 116, 118 are meant for illustration purposes, and are not meant to limit the area or direction of the field of view of a camera.

An airspace intelligence unit 102a, 102b may obtain and process computer imagery of its surrounding airspace. In this example, airspace intelligence unit 102a obtains video and/or multiple images via the computer vision module of the helicopter 120. Images of the helicopter are primarily obtained by a first camera with the field of view 112. As the helicopter moves through the airspace, the second camera with the field of view 114 then obtains video and/or multiple images of the helicopter 120. Similarly, UAV 122 is moving though the airspace and airspace intelligence unit 102b obtains video and/or multiple images of the UAV 122 moving through the field of view of second camera with a field of view 118. These are examples where an individual airspace intelligence unit 102a or 102b obtains video and/or images of an aerial object in the ambient airspace.

In some embodiments, two or more aerial observation units may observe the same aerial object moving though the airspace. Again referring to the helicopter 120, not only is imagery of the aircraft obtained by the airspace intelligence unit 102a (via the first and second camera fields of view 112 and 114), but also the airspace intelligence unit 102b via the first camera with field of view 116 obtains video and/or multiple images of the helicopter 120 as it moves into and through the airspace observed in the field of view 116. In some implementations, multiple airspace intelligence units 102a, 102b may be positioned about an area such that the airspace intelligence units have at least one overlapping field of view for a camera on airspace intelligence unit 102a and airspace intelligence unit 102b.

Overlapping camera fields of view is further illustrated by the UAV 124 moving from right to left in the airspace. Airspace intelligence unit 102b begins obtaining imagery of UAV 124 moving into the field of view 118. Airspace intelligence unit 102b continues to obtain imagery of the UAV 124 while the UAV 124 moves in the field of view 118. As the UAV 124 continues along a flight path the UAV may enter into overlapping field of views of another camera of airspace intelligence unit 102*b* and/or 102*a*. For example, in another position, UAV 124 may enter and move though airspace covered by the camera field of view 116 of airspace intelligence unit 102 and the camera field of view 114 of airspace intelligence unit 102*a*.

An airspace intelligence unit 102*a*, 102*b* may evaluate and obtain video and/or multiple images and determine a type of aerial object, a speed or velocity of the aerial object and/or a trajectory of the aerial object. For example, an airspace intelligence unit 102*a*, 102*b* may perform an objection detection process on the obtained images of the airspace. In some embodiments, the images are input into trained machine learning networks or models, and the type, speed, velocity and/or trajectory movement of the object is determined. A machine learning network may be trained to identify different types of aerial objects (such as a helicopter, UAV, commercial jet plane, etc.). For example, an image obtained by airspace intelligence unit 102*a* processed by the machine learning network may classify the type of the aerial object 120 as a helicopter and classify the type of aerial object 124 as multi-rotor UAV. In some embodiments, machine learning networks may be trained with many different aircraft of the same type and the machine learning networks may not only classify a general type of the aircraft, such as a commercial jet plane, but also may determine a particular sub-type of the aircraft, such an Airbus A220, Boeing 737, etc.

In some embodiments, based on the determined sub-type of the aircraft, the airspace intelligence unit 102*a*, 102*b* may determine a distance and altitude of the aerial object. The airspace intelligence unit may include a database of different aircraft general types and sub-types and the size or length of the aircraft. The airspace intelligence unit 102*a*, 102*b* may determine based on the pixel size of the aerial object and determine the general type and/or sub-type of the aerial object how far the aerial object is from a particular airspace intelligence unit 102*a*, 102*b*. For example, the pixel size of an aerial object depicted in an image will be larger when the aerial object is closer to the airspace intelligence unit 102*a*, 102*b*, than when the aerial object is farther away. For example, the UAV 124 depicted in the field of view 118 will be depicted as a small object in images than when the UAV 124 is closer to the airspace intelligence unit 102*b* in the field of view 116.

The detection and determination of aerial objects by the airspace intelligence units 102*a*, 102*b* provides meaningful information for operators of crewed/manned aircraft and of uncrewed/unmanned aircraft. As described herein, the system may be configured to determine aerial objects maneuvering about airspace about installed airspace intelligence units. The sensor data and processed sensor data indicating information about aerial objects may be transmitted to other computing devices, servers, radios, etc. The airspace intelligence units 102*a*, 102*b* may be networked together to share data among the networked observation units. Moreover, the airspace intelligence units 102*a*, 102*b* may be networked with one or more servers that obtain the data on aerial objects and perform additional processing or operations related to the obtained data about the aerial objects.

In some embodiments, the system may determine airspace conflict situations by evaluating observed aerial objects in the airspace. For example, a UAV operator may be performing operation about the airspace near the airspace intelligence unit 102*b*. The system may determine a potential airspace conflict with the aerial object 120 or the aerial object 122. Information about aerial objects may be received by the UAV operator's ground control station(s) where a ground control station receives real-time information about aerial objects via the aerial observation system. The system may provide potential conflict assessment, such as indication of the likelihood of collision between aerial objects. The system may consider the trajectory, air speed and maneuverability of an aerial object in determining a conflict assessment. For example, an aerial object that is determined to be a rotor-craft UAV or helicopter may be indicated as having a higher conflict potential than an aerial object determined to be a fixed-wing propeller plane.

Figure 10:
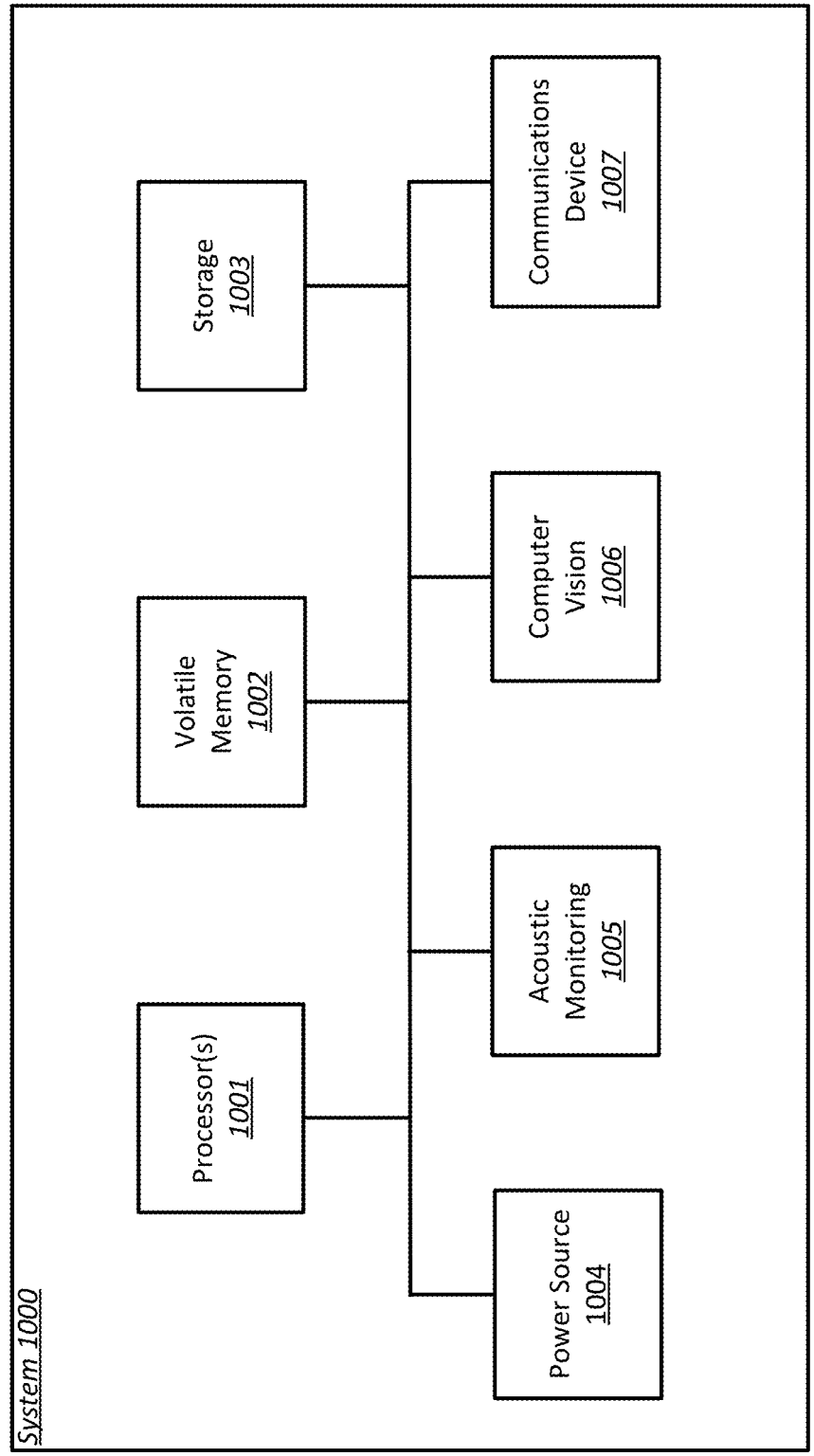
FIG. 10 is a diagram illustrating an exemplary computer system 1000 that may perform processing in some embodiments.

FIG. 10 is a diagram illustrating an exemplary computer, acoustic monitoring and computer vision module 1000 (of an airspace intelligence unit) that may perform processing in some embodiments. Processor(s) 1001 may perform computing functions such as running computer programs and performing other functions, operations or control of the system 1000. Processor(s) 1001 may include one or more computer processing units and graphical processing units. The volatile memory 1002 may provide temporary storage of data for the processor 1001. RAM is one kind of volatile memory that may be used with the system 1000. Volatile memory typically requires power to maintain its stored information. Storage 1003 provides computer storage for data, instructions, and/or arbitrary information. Non-volatile memory, which can preserve data even when not powered and including disks and flash memory, is an example of storage. Storage 1003 may be organized as a file system, database, or in other ways. Data, instructions, and information may be loaded from storage 1003 into volatile memory 1002 for processing by the processor(s) 1001. The system 900 includes an acoustic monitoring module 1005 as described herein. The system 1000 includes a computer vision system 1006 with one or more sensors as described herein. The system 1000 may include one or more communications devices for receiving and transmitting wirelessly or wired cabling to other devices. The system 1000 includes a power source 1004 such as a battery or other connectable power source.

It will be appreciated that the present disclosure may include any one and up to all of the following examples.

Example 1: An aerial object position determination system, comprising: a first unit comprising: an acoustic detection module comprising multiple microphones positioned about a central axis of the first unit; a computer vision module comprising multiple cameras positioned about the central axis of the first unit; an optional automatic dependent surveillance-broadcast (ADS-B) receiver provided with the first unit; and one or more processors, housed in the first unit, the processors configured to: receive data from the acoustic detection module, the computer vision module and the ADS-B receiver; based on the received data, determine a position of an aerial object; and transmit the position to a receiving device.

Example 2: The system of Example 1, the one or more processors further configured to: determine a trajectory of the aerial object; and transmit the trajectory to the receiving device.

Example 3: The system of any one of Examples 1-2, the one or more processors further configured to: periodically determine a revised position and trajectory of the aerial object; and transmit the revised position and trajectory of the aerial object to the receiving device.

Example 4: The system of any one of Examples 1-3, the determining a position of the aerial object comprises: inputting into a trained machine learning model the received data; and determining, by the trained machine learning model, the position of the aerial object.

Example 5: The system of any one of Examples 1-4, further comprising: classifying by the trained machine learning model a type and/or size of the aerial object.

Example 6: The system of any one of Examples 1-5, further comprising: a radar module configured to emit a radar signal and receive reflected radar signals, the received data further comprising data received from the radar module.

Example 7: The system of any one of Examples 1-6, wherein the multiple cameras positioned about the central axis with the cameras having overlapping field of view of an adjacent camera, wherein multiple cameras providing a 360 degree view about the central axis, and wherein the multiple cameras concurrently obtain images.

Example 8: The system of any one of Examples 1-7, wherein the acoustic detection module comprising an array of acoustic receiving ports spaced about the central axis.

Example 9: The system of any one of Examples 1-8, further comprising: a second unit comprising: an acoustic detection module comprising multiple microphones positioned about a central axis of the second unit; a computer vision module comprising multiple cameras positioned about the central axis of the second unit; an automatic dependent surveillance-broadcast (ADS-B) receiver provided with the second unit; and one or more processors, housed in the second unit, the processors configured to: receive data from the acoustic detection module, the computer vision module and the ADS-B receiver; based on the received data, determine a position of the aerial object; and transmit the position to the receiving device.

Example 10: The system of any one of Examples 1-9, the first unit further comprising: a satellite-based radio system provided with the first unit; wherein the one or more processors are further configured to: receive from the satellite-based radio system a geo-spatial position of the first unit; and based on the position of the aerial object and the geo-spatial position of the first unit, determine a geo-spatial position of the aerial object.

Example 11: The system of claim any one of Examples 1-10, wherein the position of the aerial object comprises one or more of an altitude, a geo-spatial location, Global Positioning System based location, Global Navigation Satellite System location, BeiDou Navigation Satellite System location and/or Galileo Navigation Satellite System location.

Example 12: A method of determining the position of an aerial object, the method comprising: providing a first unit comprising: an acoustic detection module comprising multiple microphones positioned about a central axis of the first unit; a computer vision module comprising multiple cameras positioned about the central axis of the first unit; an automatic dependent surveillance-broadcast (ADS-B) receiver provided with the first unit; receiving, via one or more processors, data from the acoustic detection module, the computer vision module and the ADS-B receiver; based on the received data, determining a position of an aerial object; and transmitting the position to a receiving device.

Example 13: The method of Example 12, further comprising: determining a trajectory of the aerial object; and transmitting the trajectory to the receiving device.

Example 14: The method of any one of Examples 12-13, further comprising periodically determining a revised position and trajectory of the aerial object; and transmitting the revised position and trajectory of the aerial object to the receiving device.

Example 15: The method of any one of Examples 12-14, the determining a position of the aerial object comprises: inputting into a trained machine learning model the received data; and determining, by the trained machine learning model, the position of the aerial object.

Example 16: The method of any one of Examples 12-15, further comprising: classifying by the trained machine learning model a type and/or size of the aerial object.

Example 17: The method of any one of Examples 12-16, further comprising: providing a radar module configured to emit a radar signal and receive reflected radar signals, the received data further comprising data received from the radar module.

Example 18: The method of any one of Examples 12-17, wherein the multiple cameras are positioned about the central axis with the cameras having overlapping field of view of an adjacent camera, wherein multiple cameras providing a 360 degree view about the central axis, and wherein the multiple cameras concurrently obtain images.

Example 19: The method of any one of Examples 12-18, wherein the acoustic detection module comprising an array of acoustic receiving ports spaced about the central axis.

Example 20: The method of any one of Examples 12-19, further comprising: providing a second unit comprising: an acoustic detection module comprising multiple microphones positioned about a central axis of the second unit; a computer vision module comprising multiple cameras positioned about the central axis of the second unit; an automatic dependent surveillance-broadcast (ADS-B) receiver provided with the second unit; and one or more processors, housed in the second unit, the processors configured to: receive data from the acoustic detection module, the computer vision module and the ADS-B receiver; based on the received data, determine a position of the aerial object; and transmit the position to the receiving device.

Example 21: The method of any one of Examples 12-20, the first unit further comprising: a satellite-based radio system provided with the first unit; wherein the one or more processors are further configured to: receive from the satellite-based radio system a geo-spatial position of the first unit; and based on the position of the aerial object and the geo-spatial position of the first unit, determine a geo-spatial position of the aerial object.

Example 22: The method of any one of Examples 12-21, wherein the position of the aerial object comprises one or more of an altitude, a geo-spatial location, Global Positioning System based location, Global Navigation Satellite System location, BeiDou Navigation Satellite System location and/or Galileo Navigation Satellite System location.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including read-only memories (ROMs), random access memories (RAMs), EPROMs, EEPROMs, magnetic cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An aerial object position determination system, comprising:
   a first unit comprising:
     an external housing;
     an internal mounting structure positioned within the external housing, the internal mounting structure comprising multiple stacked mounting frames, wherein one of the stacked mounting frames includes one or more processors; and
     a top component coupled to the external housing, wherein the top component comprises:
       one or more microphones positioned within the top component;
       multiple ports positioned radially about the top component, the multiple ports configured to direct ambient sounds waves toward a center portion of the top component to the one or more microphones; and
       multiple cameras positioned radially about a central axis of the top component of the first unit, the multiple cameras positioned in the top component to obtain imagery of an aerial object;
     wherein the one or more processors are configured to:
       receive data from the one or more microphones, and the multiple cameras;
       based on the received data, determine a position of the aerial object; and
       transmit the position to a receiving device.

2. The system of claim 1, the one or more processors further configured to:
   determine a trajectory of the aerial object; and
   transmit the trajectory to the receiving device.

3. The system of claim 1, the one or more processors further configured to:
   periodically determining a revised position and trajectory of the aerial object; and
   transmitting the revised position and trajectory of the aerial object to the receiving device.

4. The system of claim 1, the determining a position of the aerial object comprises:
   inputting into a trained machine learning model the received data; and
   determining, by the trained machine learning model, the position of the aerial object.

5. The system of claim 1, further comprising:
   classifying by the trained machine learning model a type and/or size of the aerial object.

6. The system of claim 1, further comprising:
   a radar component configured to emit a radar signal and receive reflected radar signals, the received data further comprising data received from the radar component.

7. The system of claim 1, wherein the multiple cameras positioned about the central axis with the cameras having overlapping field of view of an adjacent camera, wherein multiple cameras providing a 360 degree view about the central axis, and wherein the multiple cameras concurrently obtain images.

8. The system of claim 1, the first unit further comprising:
   a satellite-based radio system provided with the first unit;
   wherein the one or more processors are further configured to:
   receive from the satellite-based radio system a geo-spatial position of the first unit; and
   based on the position of the aerial object and the geo-spatial position of the first unit, determine a geo-spatial position of the aerial object.

9. The system of claim 1, wherein the position of the aerial object comprises one or more of an altitude, a geo-spatial location, Global Positioning System based location, Global navigation Satellite System location, a BeiDou Navigation Satellite System location and/or a Galileo Navigation Satellite System location.

10. The system of claim 1, the multiple cameras comprise four cameras equally spaced about at 90 degree intervals with each camera having a field of view ranging from 100-150 degrees, and the multiple cameras each positioned upward between about 30 to 75 degrees from a horizontal plane intersecting the central axis.

11. The system of claim 1, wherein each of the stacked mounting frames includes an opening with a longitudinal rod disposed through the opening of each stacked mounting from, and wherein the longitudinal rod is connected to the top component.

12. The system of claim 11, wherein the first unit further comprises:
a base component connected to the longitudinal rod.

13. The system of claim 12, wherein one of the stacked mounting frames includes a fan, the fan configured to move air through the base component.

14. A method of determining the position of an aerial object position determination system, the method comprising:
providing a first unit comprising:
an external housing;
an internal mounting structure positioned within the external housing, the internal mounting structure comprising multiple stacked mounting frames, wherein one of the stacked mounting frames includes one or more processors; and
a top component coupled to the external housing, wherein the top component comprises:
one or more microphones positioned within the top component;
multiple ports positioned radially about the top component, the multiple ports configured to direct ambient sounds waves toward a center portion of the top component to the one or more microphones;
multiple cameras positioned radially about a central axis of the top component of the first unit, the multiple cameras positioned in the top component to obtain imagery of an aerial object; and
receiving, via one or more processors, data from the one or more microphones, and the multiple cameras;
based on the received data, determining a position of an aerial object; and
transmitting the position to a receiving device.

15. The method of claim 14, further comprising:
determining a trajectory of the aerial object; and
transmitting the trajectory to the receiving device.

16. The method of claim 14, further comprising
periodically determining a revised position and trajectory of the aerial object; and
transmitting the revised position and trajectory of the aerial object to the receiving device.

17. The method of claim 14, the determining a position of the aerial object comprises:
inputting into a trained machine learning model the received data; and
determining, by the trained machine learning model, the position of the aerial object.

18. The method of claim 17, further comprising:
classifying by the trained machine learning model a type and/or size of the aerial object.

19. The method of claim 14, further comprising:
providing a radar component configured to emit a radar signal and receive reflected radar signals, the received data further comprising data received from the radar component.

20. The method of claim 14, wherein the multiple cameras are positioned about the central axis with the cameras having overlapping field of view of an adjacent camera, wherein multiple cameras providing a 360 degree view about the central axis, and wherein the multiple cameras concurrently obtain images.

21. The method of claim 14, the first unit further comprising:
a satellite-based radio system provided with the first unit;
wherein the one or more processors are further configured to:
receive from the satellite-based radio system a geo-spatial position of the first unit; and
based on the position of the aerial object and the geo-spatial position of the first unit, determine a geo-spatial position of the aerial object.

22. The method of claim 14, wherein the position of the aerial object comprises one or more of an altitude, a geo-spatial location, Global Positioning System based location, Global navigation Satellite System location, a BeiDou Navigation Satellite System location and or a Galileo Navigation Satellite System location.

* * * * *